United States Patent [19]

Gorczyca et al.

[11] Patent Number: 5,822,531

[45] Date of Patent: Oct. 13, 1998

[54] METHOD AND SYSTEM FOR DYNAMICALLY RECONFIGURING A CLUSTER OF COMPUTER SYSTEMS

[75] Inventors: Robert Gorczyca, Cambridge; Aamir Arshad Rashid, Norwood, both of Mass.; Kevin Forress Rodgers, Derry, N.H.; Stuart Warnsman, Watertown, Mass.; Thomas Van Weaver, Dripping Springs, Tex.

[73] Assignee: International Business Machines Corporation, Armonk, N.Y.

[21] Appl. No.: 681,324

[22] Filed: Jul. 22, 1996

[51] Int. Cl.[6] .............................. G06F 9/445; G06F 9/06
[52] U.S. Cl. .................... 395/200.51; 395/653; 707/202
[58] Field of Search ................................ 395/284, 200.62, 395/827, 830, 712, 182.18, 183.01, 653, 200.5; 384/DIG. 1, DIG. 2; 379/115, 207, 34

[56] References Cited

U.S. PATENT DOCUMENTS 5,161,102 11/1992 Griffin et al. ........................... 385/284
5,257,368 10/1993 Benson et al. ......................... 395/827

*Primary Examiner*—Daniel H. Pan
*Attorney, Agent, or Firm*—Richard A. Henkler; Brian F. Russell; Andrew J. Dillon

[57] ABSTRACT

A method and system for dynamically reconfiguring a cluster of computer systems are disclosed. In accordance with the present invention, a first configuration file is provided at a plurality of computer systems within a cluster that specifies a current configuration of the cluster. A second configuration file is created at each of the plurality of computer systems that specifies a modified configuration of the cluster. The modified configuration is then verified. In response to the verification, the cluster is operated utilizing the modified configuration. In accordance with one embodiment, the dynamic reconfiguration of the cluster can include a reconfiguration of the cluster topology or resources.

22 Claims, 6 Drawing Sheets

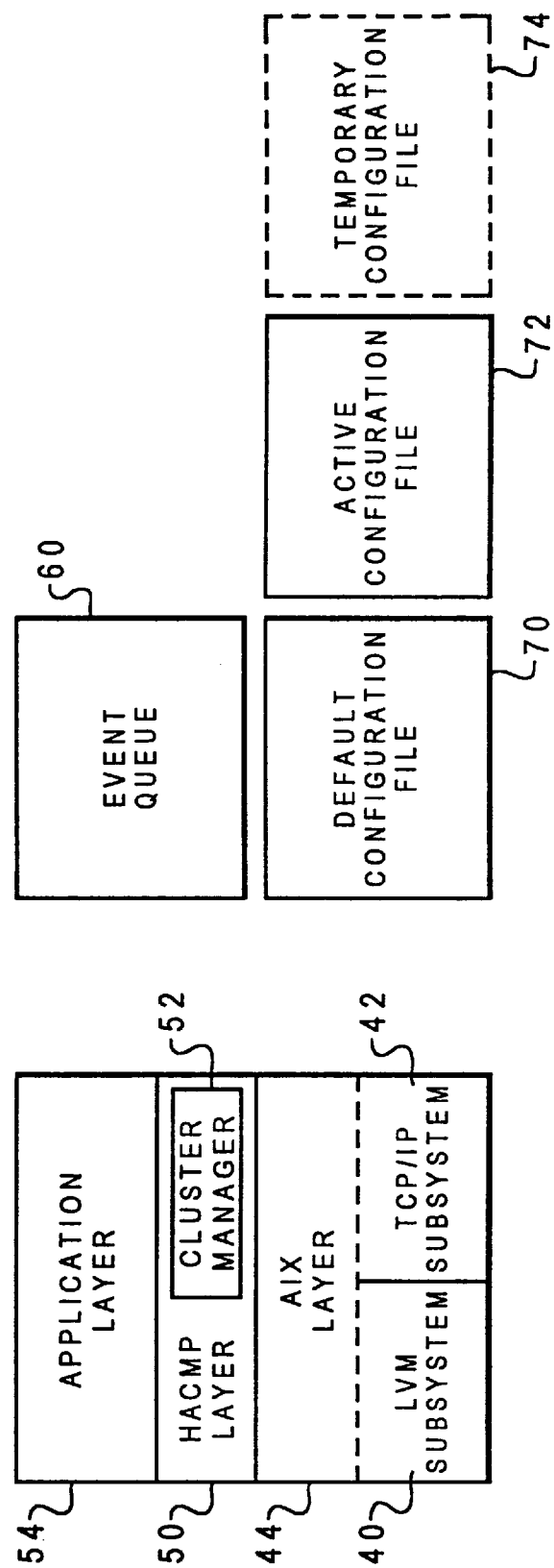

METHOD AND SYSTEM FOR DYNAMICALLY RECONFIGURING A CLUSTER OF COMPUTER SYSTEMS

BACKGROUND OF THE INVENTION

1. Technical Field

The present invention relates in general to a method and system for data processing and in particular to a method and system for configuring a cluster of computer systems. Still more particularly, the present invention relates to method and system for dynamically reconfiguring a cluster of computer systems, which permit the default configuration of the cluster to be modified without limiting the availability of system resources and services owned by the cluster.

2. Description of the Related Art

Data processing systems are frequently utilized to process data and monitor and manage events in contexts in which reliability and guaranteed access to system resources are of paramount importance. For example, data processing systems are utilized to manage critical databases, automate assembly and production lines, and implement complex control systems. Because of the demands of such mission-critical computing environments, fault tolerant data processing systems were developed. Fault tolerant data processing systems rely on specialized hardware to detect a hardware fault and rapidly incorporate a redundant hardware component into the data processing system in place of the failed hardware component. Although fault tolerant data processing systems can transparently provide reliable and nearly instantaneous recovery from hardware failures, a high premium is often paid in both hardware cost and performance because the redundant components do no processing. Furthermore, conventional fault tolerant data processing systems only provide protection from system hardware failures and do not address software failures, a far more common source of system down time.

In response to the need for a data processing system that provides both high availability of system resources and protection from software failures, cluster architecture was developed. A cluster can be defined as multiple loosely coupled server machines that cooperate to provide client processors with reliable and highly available access to a set of system services or resources. High availability of cluster resources, which can include both hardware and software such as disks, volume groups, file systems, network addresses, and applications, is ensured by defining takeover relationships that specify which of the server machines comprising a cluster assumes control over a group of resources after the server machine that originally owned the group of resources relinquishes control due to reconfiguration of the cluster or failure.

Cluster configuration information specifying the server machines (hereafter referred to as nodes) belonging to a cluster and takeover relationships within the cluster have conventionally been stored within a default configuration file that is accessed by configuration utilities, event scripts, and other programs executed on the various nodes within a cluster. Because of the strict dependency of these node programs on the configuration information stored within the default configuration file, the default configuration file utilized by a conventional cluster must be unmodifiable while the cluster is active. Thus, in order to modify the topology or resources of a conventional cluster, a cluster administrator must take down the cluster, thereby rendering the system services and resources of the cluster inaccessible to clients.

As should thus be apparent, an improved method and system for reconfiguring a cluster is needed that permits a cluster administrator to modify the default configuration of a cluster without rendering the system resources and services owned by the cluster inaccessible to clients.

SUMMARY OF THE INVENTION

It is therefore one object of the present invention to provide an improved method and system for data processing.

It is another object of the present invention to provide a method and system for configuring a cluster of computer systems.

It is yet another object of the present invention to provide a method and system for dynamically reconfiguring a cluster of computer systems, which permit the default configuration of the cluster to be modified without limiting the availability of system resources and services owned by the cluster.

The foregoing objects are achieved as is now described. A method and system for dynamically reconfiguring a cluster of computer systems are provided. In accordance with the present invention, a first configuration file is provided at a plurality of computer systems within a cluster that specifies a current configuration of the cluster. A second configuration file is created at each of the plurality of computer systems that specifies a modified configuration of the cluster. The modified configuration is then verified. In response to the verification, the cluster is operated utilizing the modified configuration. In accordance with one embodiment, the dynamic reconfiguration of the cluster can include a reconfiguration of the cluster topology or resources.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 2A–2B depict a layer diagram of the software configuration of a node within the cluster illustrated in FIG. 1;

DETAILED DESCRIPTION OF PREFERRED EMBODIMENT

Figure 1:
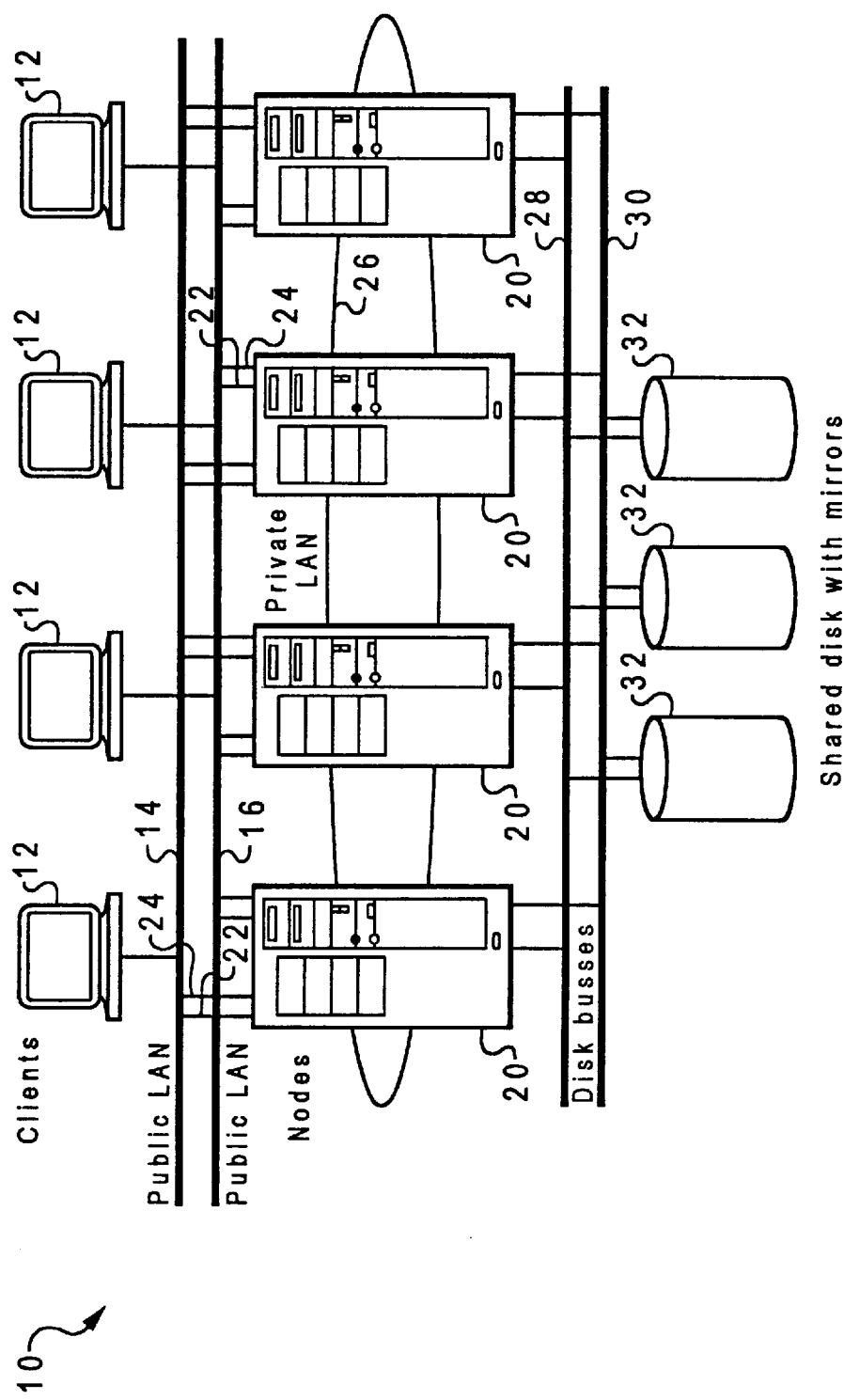
FIG. 1 depicts in an illustrative embodiment of a cluster multi-processing system, which can be dynamically reconfigured in accordance with the present invention.

With reference now to the figures and in particular with reference to FIG. 1, there is illustrated a cluster 10, which may be dynamically reconfigured in accordance with the present invention. As illustrated, cluster 10 is a multi-processor data processing system including one or more clients 12, which each comprise a personal computer or workstation, for example. Each of clients 12 runs a "front end" or client application that issues service requests to server applications running on nodes 20. A client 12 communicates with other clients 12 and with nodes 20 via one of public Local Area Networks (LANs) 14 and 16, which can comprise Ethernet, Token-Ring, FDDI or other networks. Communication across public LANs 14 and 16 is regulated by a communication protocol such as TCP/IP.

In order to ensure that cluster resources are highly available to clients 12, cluster 10 includes multiple nodes 20, which preferably comprise uniprocessor or multi-processor data processing systems, such as the RISC System/6000 available from IBM Corporation. In contrast to fault tolerant systems, which include idle redundant hardware, each node 20 within cluster 10 runs a server or "backend" application, which performs tasks in response to service requests issued by clients 12. As illustrated, in order to eliminate as many single points of failure as possible, each of clients 20 has at least two network adapters for each connected network: a service network adapter 22 and a standby network adapter 24. Service network adapter 22, which provides the primary connection between a node 20 and one of public LANs 14 and 16, is assigned an IP address that is published to application programs running on clients 12. If a service network adapter 22 of one of nodes 20 fails, High Availability Cluster Multi-Processing (HACMP) software running on the node 20 substitutes the IP address assigned to standby network adapter 24 for the IP address assigned to the failed service network adapter 22 in order to maintain high availability of cluster resources and services. Similarly, if a local node 20 is designated to service requests addressed to a peer node 20 should the peer node 20 fail, standby network adapter 24 of local node 20 is assigned the IP address of the service network adapter 22 of peer node 20 upon failure. In addition to the communication path provided by public LANs 14 and 16, nodes 20 can communicate across private LAN 26, which provides peer-to-peer communication between nodes 20, but does not permit access by clients 12. Private LAN 26 can be implemented utilizing an Ethernet, Token-Ring, FDDI, or other network. Alternatively, a serial communication channel such as a SCSI-2 differential bus or RS-232 serial line can be utilized.

As depicted, cluster 10 further includes shared external disks 32, which are accessible to each node 20 via redundant disk busses 28 and 30. Shared disks 32 store mission-critical data, which is typically mirrored to provide data redundancy. Shared disks 32, volume groups, file systems, and applications stored within shared disks 32, and IP addresses assigned to network adapters 22 and 24 together form a set of cluster resources essential to processing, which the architecture of cluster 10 makes highly available to clients 12. The operation and components of cluster multi-processing systems such as cluster 10 are described in greater detail in *High Availability Cluster Multi-Processing 4.1 for AIX: Concepts and Facilities,* which is available from IBM Corporation as Publication No. SC23-2767-01 and is incorporated herein by reference.

Referring now to FIGS. 2A and 2B, software and data models of each node 20 within cluster 10 are depicted. The illustrated software and data are considered private, in that each node 20 individually stores its respective software and data internally rather than in shared disks 32. With reference first to FIG. 2A, the software model of each node 20 has an AIX (Advanced Interactive executive) layer 44 at the lowest level, which provides operating system services such as memory allocation and thread scheduling. As illustrated, AIX layer 44 includes a Logical Volume Manager (LVM) subsystem 40, which manages shared disks 32 at the logical level. In addition, a TCP/IP subsystem 42 is provided that manages communication between local node 20 and clients 12 and peer nodes 20 across public LANs 14 and 16 and private LAN 26.

In accordance with the present invention, the software model of each node 20 also includes a High Availability Cluster Multi-Processing (HACMP) layer 50, which interacts with AIX layer 44 to provide a highly available computing environment. HACMP layer 50 includes cluster manager 52, which has the primary responsibilities of monitoring the hardware and software subsystems of cluster 10, tracking the state of nodes 20, and responding appropriately to maintain the availability of cluster resources in response to a change in the state of cluster 10. Cluster manager 52 monitors the status of neighboring nodes 20 by transmitting "heartbeat" messages to which neighboring nodes 20 respond with similar messages. In response to a change in the state of cluster 10, for example, a failure of one of nodes 20, cluster manager 52 runs appropriate scripts to implement the takeover relationships specified within default configuration file 70 (illustrated in FIG. 2B). As described in greater detail below, cluster manager 52 also responds to Dynamic Automatic Reconfiguration Events (DAREs), which are initiated by a cluster administrator in order to dynamically reconfigure the topology or resources of cluster 10.

The software model illustrated in FIG. 2A further includes an application layer 54, which provides services to client applications running on clients 12 and itself utilizes services provided by AIX layer 44 and HACMP layer 50. Application software within application layer 54 is among the cluster resources to which HACMP 50 provides highly available access.

Referring now to FIG. 2B, the data model of each active node 20 includes an event queue 60, a default configuration file 70, and an active configuration file 72. Event queue 60 is a first in/first out (FIFO) queue that temporarily stores events to be processed by HACMP layer 50. Events within event queue 60 can include events generated internally by cluster manager 52 as well as events received by cluster manager 52 from clients 12 and peer nodes 20. Default configuration file 70 contains cluster and AIX configuration information utilized by HACMP configuration utilities, cluster daemons such as cluster manager 52, and the event scripts executed by cluster manager 52. When cluster daemons are started on a node 20, the contents of default configuration file 70 are copied to active configuration file 72 for access by all cluster daemons, event scripts, and HACMP configuration utilities. As described in greater detail below with reference to FIGS. 3A–3C, cluster manager 52 creates a temporary configuration file 74 in response to receipt of a DARE in order to prevent the corruption of configuration files 70 and 72 during the implementation of the specified configuration modifications.

Figure 3A:
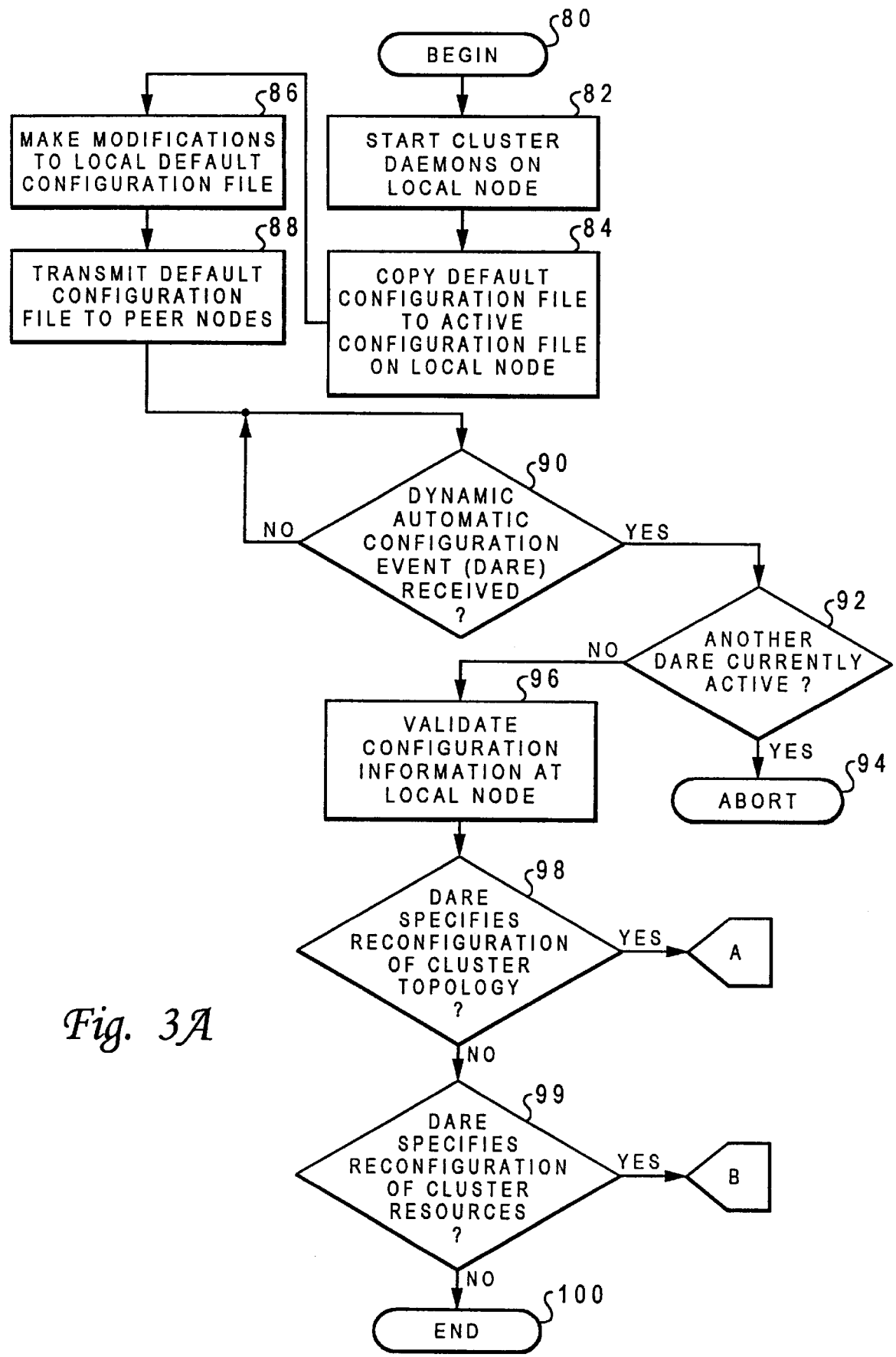
FIG. 3A–3C together form a flowchart of an illustrative embodiment of a method for dynamically reconfiguring a cluster in accordance with the present invention.
Figure 3B:
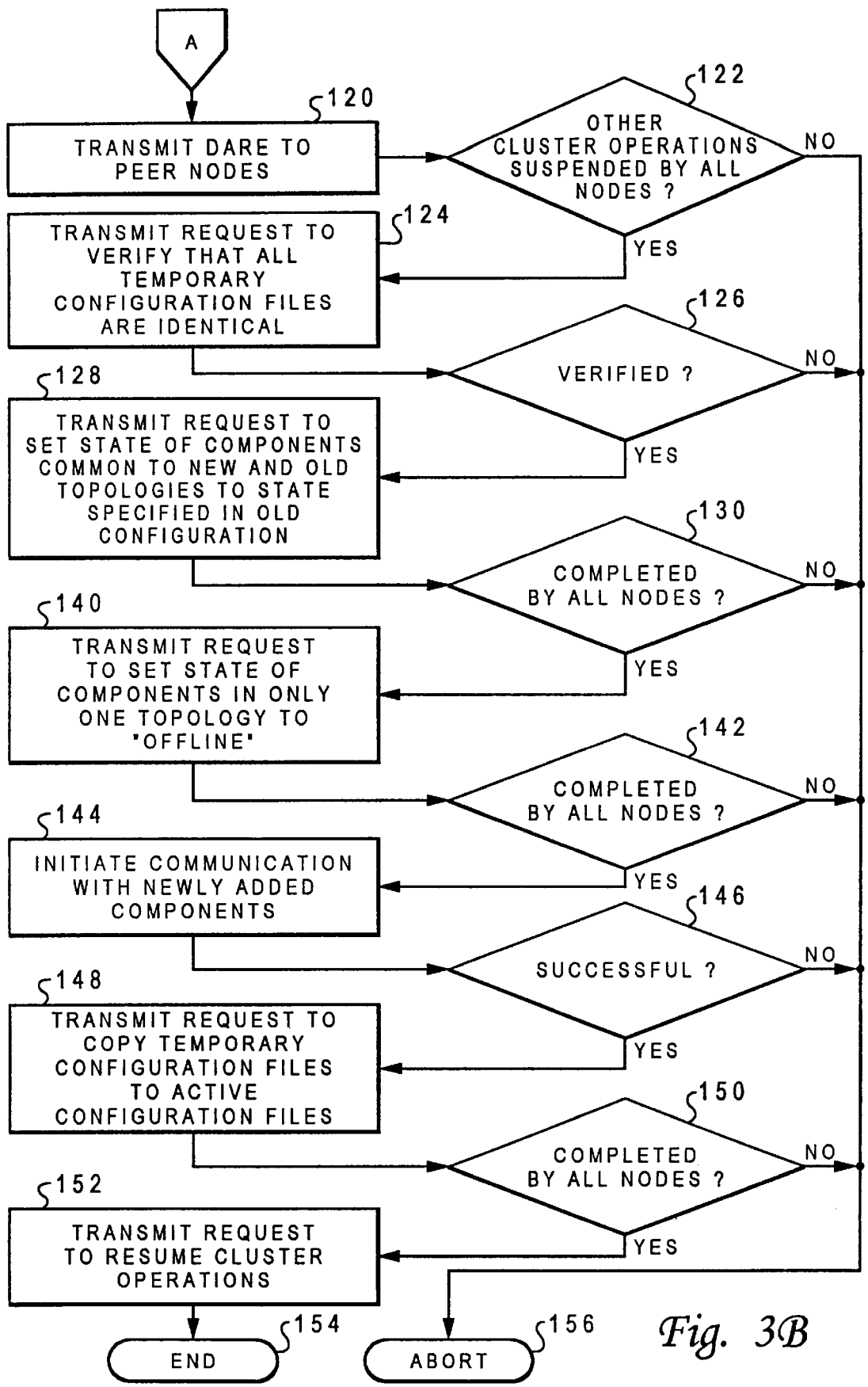
Figure 3C:
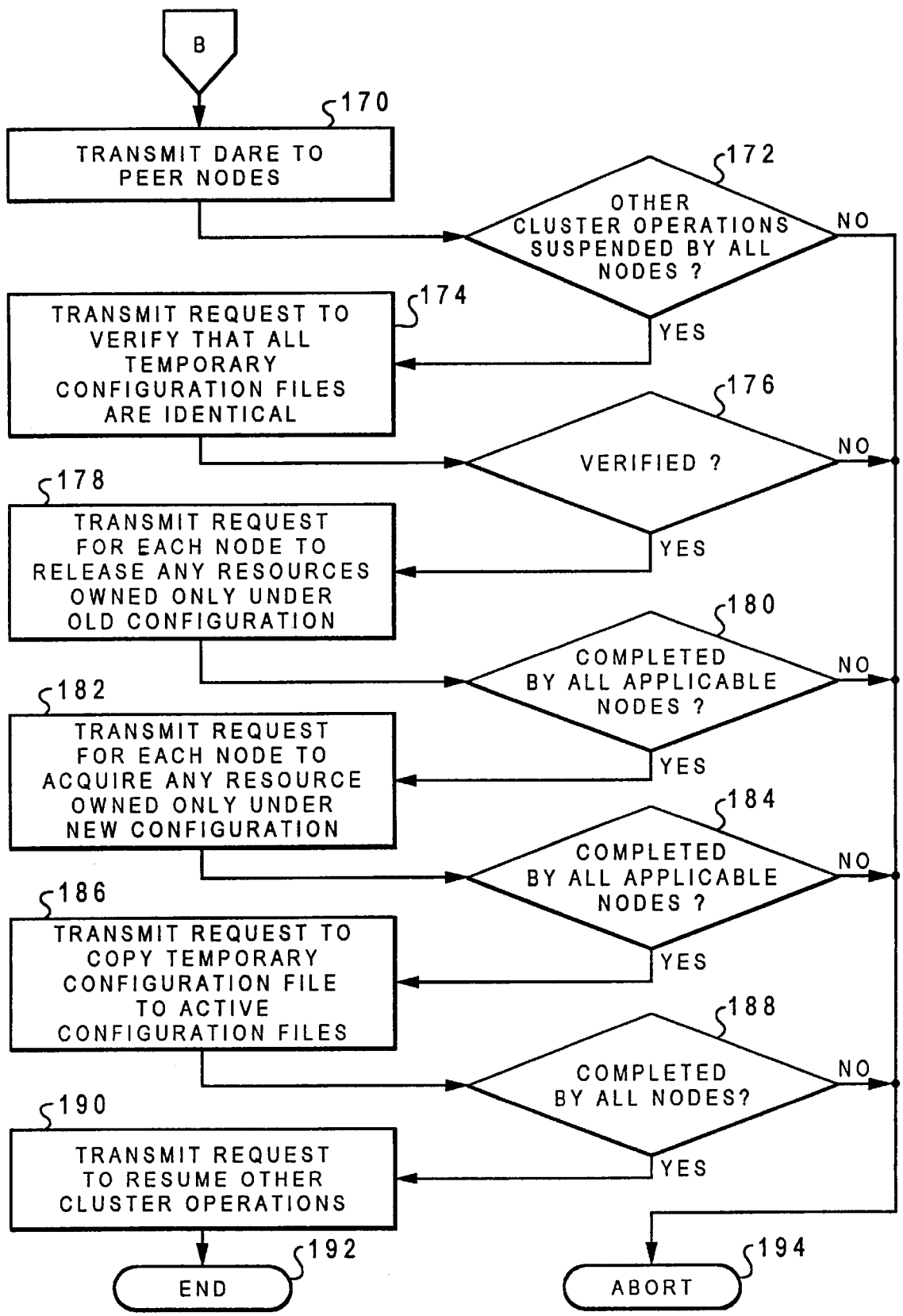

With reference now to FIGS. 3A–3C, there is illustrated a logical flowchart of an illustrative embodiment of a method for dynamically reconfiguring a cluster in accordance with the present invention. The depicted method is performed within a local node 20 of cluster 10 by cluster manager 52 and other cluster daemons within HACMP layer 50. As illustrated, the process begins at block 80 upon the activation of local node 20 and thereafter proceeds to block 82, which illustrates starting cluster manager 52 and other daemons on local node 20. The process then proceeds to block 84, which depicts HACMP layer 50 copying default configuration file 70 to active configuration file 72 in response to the activation of the cluster daemons at block 82. As noted above, active configuration file 72 can then be accessed by all cluster daemons, event scripts, and HACMP configuration utilities running on local node 20. The process proceeds from block 84 to block 86, which illustrates the application of user-specified modifications of the cluster configuration to local default configuration file 70. The contents of local default configuration file 70 is then transmitted to all peer nodes 20, as indicated at block 88. Despite the changes made to local default configuration file 70 at block 86, no change is reflected in the operation of cluster 10 because the software running of local node 20 references active configuration file 72 rather than default configuration file 70. The process then proceeds to block 90, which illustrates cluster manager 52 determining whether or not a DARE has been received at local node 20. In the depicted configuration of cluster 10, a DARE can be conveniently initiated by a cluster administrator through entry of inputs via a user interface provided within one of clients 12 that indicate that the modifications to default configuration file 70 are to be implemented throughout cluster 10.

In response to a determination at block 90 that a DARE has not been received, the process iterates at block 90 until such time as a DARE is received. In response to receipt of a DARE at local node 20, the process proceeds from block 90 to block 92, which illustrates HACMP layer 50 determining whether or not a DARE is currently active within cluster 10. If so, the DARE received at block 90 is aborted, as illustrated at block 94. The serialization of DAREs in this manner prevents a cluster-wide configuration corruption, which could otherwise result from the simultaneous application of conflicting cluster configurations. In response to a determination at block 92 that another DARE is not currently pending, the process proceeds to blocks 96, which depicts HACMP layer 50 of local node 20 validating the configuration information within the DARE. Next, the process proceeds to block 98, which illustrates a determination of whether or not the DARE specifies a reconfiguration of the topology of cluster 10, for example, by adding or deleting a node, network, or adapter. If so, the process passes through page connector A to block 120 of FIG. 3B. The determination illustrated at block 98 can be made, for example, by calculating and comparing separate checksums of the cluster topology information specified in the DARE and that formerly stored within default configuration file 70. In accordance with this embodiment, the checksum is a variable-length bit stream, which is calculated by cluster manager 52 in a specified manner that yields diverse checksums for different cluster configurations.

Referring now to block 120 of FIG. 3B, following a determination at block 96 that the DARE specifies a reconfiguration of the topology of cluster 10, cluster manager 52 requests and verifies that cluster managers 52 on peer nodes 20 all process the DARE request in a number of synchronized sequential steps. Thus, as depicted at block 120, cluster manager 52 on local node 20 first transmits a DARE to peer cluster managers 52.

Figure 4:
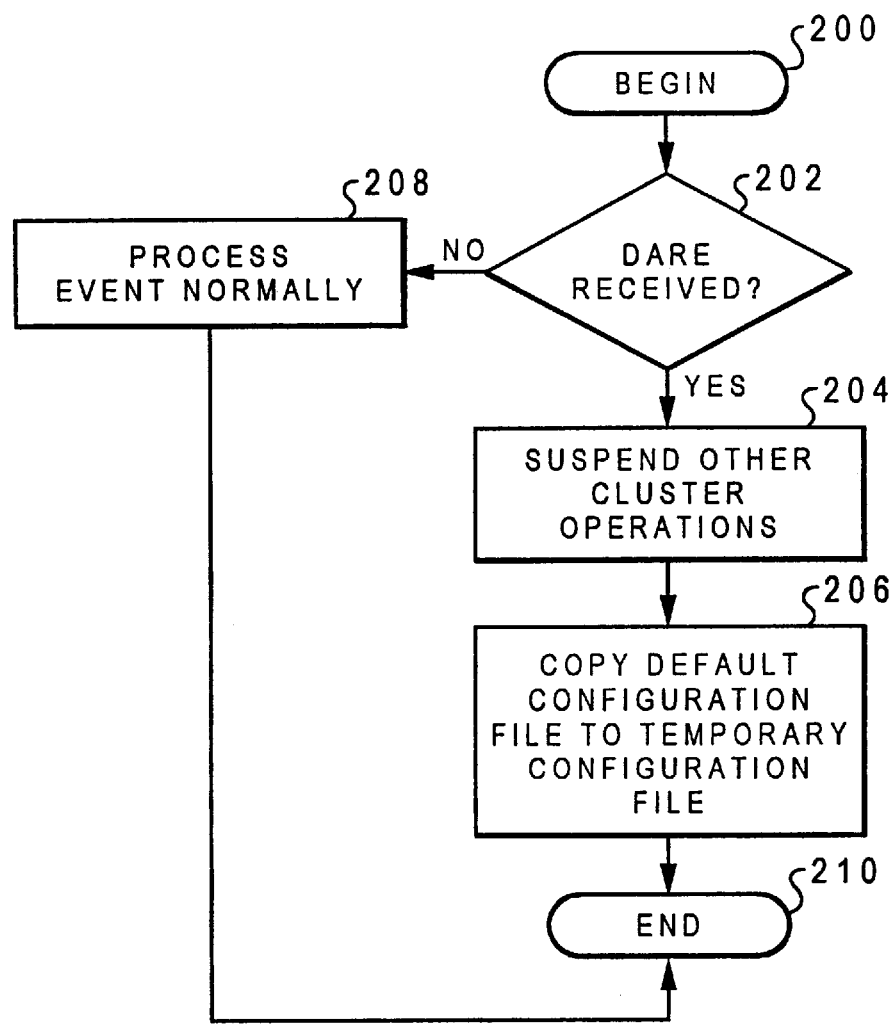
FIG. 4 is a flowchart illustrating the behavior of a peer node in response to receipt of a cluster reconfiguration event.

Referring now to FIG. 4, there is depicted a flowchart illustrating the method in which a peer node 20 within cluster 10 responds to request to the DARE transmitted by local node 20 at block 120 of FIG. 3B. As illustrated, the process begins at block 200 in response to receipt of an event and thereafter proceeds to block 202, which illustrates a determination by peer cluster manager 52 whether or not a DARE has been received. If not, the process passes to block 208, which illustrates peer node 20 processing the event normally. Thereafter, the process terminates at block 210.

However, in response to a determination at block 202 that a DARE has been received at peer node 20, the process proceeds to block 204, which illustrates peer cluster manager 52 suspending other cluster operations such as heartbeat communication. Next, as shown at block 206, peer cluster manager 52 copies the contents of local default configuration file 70, which was previously sent to peer node 20, to peer temporary configuration file 74. The process then terminates at block 210.

Referring again to block 120 of FIG. 3B, following the transmission of the DARE, local cluster manager 52 determines whether or not all peer nodes 20 have suspended cluster operations and copied local default configuration file 70 to peer temporary configuration file 74. If not, the process passes to block 156, which illustrates local cluster manager 52 aborting the requested dynamic reconfiguration of cluster 10. Returning to block 122, in response to a determination that cluster operations have been suspended by all peer nodes 20 within cluster 10, the process proceeds to block 124, which depicts local cluster manager 52 transmitting a message to peer nodes 20 that requests peer cluster managers 52 to verify that all temporary configuration files 74 are identical. As illustrated at block 126, in response to a determination that the reply messages from peer nodes 20 indicate that all temporary configuration files are identical, the process proceeds to block 128. However, if the replies to local cluster manager 52 indicate that not all temporary configuration files 74 are identical, the reconfiguration process is aborted, as depicted at block 156.

Returning to block 128, local cluster manager 52 then transmits a message requesting that peer cluster managers 52 set the state of components common to both the new and old cluster topologies to the state specified in the old configuration. For example, the state of components in the old configuration are set to active and the state of newly added components is set to "offline" or inactive. The process then proceeds to block 130, which illustrates a determination whether the request made at block 128 has been completed by all peer nodes 20. If not, the process proceeds to block 156 in the manner which has been described. However, in response to a determination that the state of the components common to the new and old configurations have been set as requested, the process proceeds to block 140, which illustrates local cluster manager 52 transmitting a message requesting that peer cluster managers 52 set the state of components which are members of only the new or old topology to offline. Following a successful verification at block 142 that the request made at block 140 was fulfilled by all peer nodes 120, the process proceeds to block 144.

Block 144 depicts cluster manager 52 initiating heartbeat communication with newly added components of cluster 10. The process proceeds from block 144 to block 146, which illustrates a determination of whether or not the heartbeat messages issued at block 144 were answered by the newly added components of cluster 10. If not, the reconfiguration of cluster 10 is aborted at block 156 in the manner which has been described. However, if local cluster manager 52 receives a return heartbeat message from each of the newly added components, the process passes from block 146 to block 148, which illustrates cluster manager 52 transmitting a message requesting that peer cluster managers 52 copy their respective temporary configuration file 74 to active configuration file 72. The process then proceeds to block 150, which depicts a determination of whether or not the overwriting of active configuration file 72 has been completed by all peer nodes 20 within cluster 10. If not, the reconfiguration process is aborted at block 156. However, if the modification of active configuration file 72 has been accomplished by all peer nodes 20, the process passes to block 152, which illustrates local node 20 transmitting a message to peer nodes 20 requesting that peer nodes 20 resume cluster operations such as heartbeat communication and failure recovery. Following the execution of the step illustrative at block 152, nodes 20 are again available to process DAREs. Thereafter, the process terminates at block 154.

Returning to block 98 of FIG. 3A, in response to a determination that the DARE does not specify a reconfiguration of the topology of cluster 10, the process passes to block 99, which depicts a determination of whether of not the DARE specifies a reconfiguration of cluster resources. If not, the process terminates at block 100. However, if a determination is made at block 99 that the DARE specifies a reconfiguration of cluster resources, the process proceeds through page connector B to block 170 of FIG. 3C. Block 170 illustrates local cluster manager 52 transmitting a DARE to peer nodes 20. As illustrated at block 172, local cluster manager 52 then determines from reply messages whether or not peer nodes 20 have suspended other cluster operations and copied local default configuration file 70 to peer temporary configuration file 74. If not, the process passes to block 194, which illustrates local cluster manager 52 aborting the requested dynamic reconfiguration of the resources of cluster 10. However, in response to a determination that all peer nodes 20 have responded to the DARE as illustrated in FIG. 4, the process proceeds to block 174, which depicts local cluster manager 52 transmitting a message to peer nodes 20 requesting verification that the temporary configuration files 74 of all peer nodes 20 are identical. As illustrated at block 176, in response to a determination that the return messages from peer nodes 20 indicate that all temporary configuration files are identical, the process proceeds to block 178.

Block 178 illustrates local cluster manager 52 transmitting a message requesting that peer cluster managers 52 release any cluster resources owned by the peer node 20 under the old configuration, but not under the new configuration. In accordance with the request depicted at block 178, peer nodes 20 discontinue the provision of system services that require that the use of network adapters, application programs, and other cluster resources no longer owned by that peer node 20. A determination is then made by local cluster manager 52 whether or not all peer nodes 20 affected by the request issued at block 178 have complied with the request. If not, the process passes to block 194, which illustrates cluster manager 52 aborting the resource reconfiguration of cluster 10. If, on the other hand, all peer nodes 20 to which the request issued at block 178 is applicable have released the indicated resources, the process proceeds from block 180 to block 182. Block 182 depicts cluster manager 52 transmitting a message requesting that each peer node 20 acquire any cluster resources owned by the peer nodes 20 only under the new configuration. As before, if the request depicted at block 182 is not completed by all applicable peer nodes 20, the process proceeds from block 184 to block 194 where the resource reconfiguration is aborted. However, following a verification at block 184 that the request depicted at block 182 has been completed by all peer nodes 20, the process proceeds to block 186, which illustrates local cluster manager 52 transmitting a message requesting that peer cluster managers 52 copy their respective temporary configuration file 74 to active configuration file 72. Next, the process proceeds from block 186 to block 188, which illustrates a determination by local cluster manager 52 whether or not all peer nodes 20 have completed the request depicted at block 186. If not, the reconfiguration process is aborted at block 194. However, if all peer nodes 20 have overwritten their respective active configuration file 72 with the new cluster configuration, the process passes to block 190, which illustrates local cluster manager 52 transmitting a message to peer nodes 20 requesting that peer cluster managers 52 resume other cluster operations. The process then terminates at block 192.

As has been described, the present invention provides a method and system for dynamically reconfiguring a cluster of computer systems which permit uninterrupted provision of system service to clients within the cluster. In accordance with the present invention, updates to the configuration files of peer nodes within the cluster are performed in a synchronized manner in order to insure that a consistent cluster configuration is maintained across all nodes within the cluster.

While the invention has been particularly shown and described with reference to a preferred embodiment, it will be understood by those skilled in the art that various changes in form and detail may be made therein without departing from the spirit and scope of the invention. For example, although the present invention has been described with reference to an illustrative embodiment in which software implementing the present invention is stored within and executed on a multi-processing cluster, such software can alternatively be embodied as a computer program product residing within recordable media such as magnetic and optical disks or transmission media such as digital and analog communications links.

What is claimed is:

1. A method of dynamically reconfiguring a cluster including a plurality of computer systems, said method comprising:

providing a first configuration file at each of a plurality of computer systems within a cluster, said first configuration file containing a current configuration of said cluster;

creating a second configuration file at each of said plurality of computer systems, wherein said second configuration file specifies a modified configuration of said cluster, said modified configuration including a modified cluster topology;

verifying said modified configuration, wherein verifying said modified configuration includes establishing communication with each computer system within said modified configuration and not within said current configuration; and in response to said verification, operating said cluster utilizing said modified configuration.

2. The method of dynamically reconfiguring a cluster of claim 1, wherein said steps of creating, verifying, and operating are synchronized between said plurality of computer systems.

3. The method of dynamically reconfiguring a cluster of claim 1, and further comprising:

determining whether said creating and verifying steps were successfully completed by all of said plurality of computer systems; and in response to a failure of any of said plurality of computer systems to complete said creating and verifying steps, aborting said dynamic reconfiguration of said cluster.

4. A method of dynamically reconfiguring a cluster including a plurality of computer systems, said method comprising:

providing a first configuration file at each of a plurality of computer systems within a cluster, said first configuration file containing a current configuration of said cluster;

creating a second configuration file at each of said plurality of computer systems, wherein said second configuration file at each of said plurality of computer systems specifies a modified configuration including a diverse set of cluster resources than specified by said first configuration file;

verifying said modified configuration; and in response to said verification, operating said cluster utilizing said modified configuration.

5. The method of dynamically reconfiguring a cluster of claim 4, wherein said step of verifying said modified configuration comprises verifying ownership by said plurality of computer systems of selected resources accessable under said modified configuration.

6. The method of dynamically reconfiguring a cluster of claim 4, wherein said steps of creating, verifying, and operating are synchronized between said plurality of computer systems.

7. The method of dynamically reconfiguring a cluster of claim 4, and further comprising:

determining whether said creating and verifying steps were successfully completed by all of said plurality of computer systems; and in response to a failure of any of said plurality of computer systems to complete said creating and verifying steps, aborting said dynamic reconfiguration of said cluster.

8. A cluster data processing system, comprising:

a plurality of computer systems, each of said plurality of computer systems including a memory;

a communications link connecting each of said plurality of computer systems with at least one other of said plurality of computer systems for communication;

a first configuration file stored within memory at each of said plurality of computer systems, said first configuration file containing a current configuration of said cluster; and a cluster manager stored within said memory of at least one of said plurality of computer systems and executable by at least one of said plurality of computer systems, wherein said cluster manager creates a second configuration file at each of said plurality of computer systems, said second configuration file specifying a modified configuration of said cluster, and wherein said cluster manager verifies said modified configuration of said cluster, and in response to said verification, operates said cluster utilizing said modified configuration.

9. The cluster a data processing system of claim 8 wherein said second configuration file created at each of said plurality of computer systems by said cluster manager specifies a modified cluster topology.

10. The cluster data processing system of claim 9, wherein said cluster manager verifies said modified configuration by establishing communication with each computer system that is within said modified configuration and not within said current configuration.

11. The cluster data processing system of claim 8, wherein said second configuration file created at each of said plurality of computer systems by said cluster manager specifes a diverse set of cluster resources than said first configuration file.

12. The cluster data processing system of claim 11, wherein said cluster manager verifies said configuration by verifying ownership by said plurity of computer systems of selected resources accessable under said modified configuration.

13. The cluster data processing system of claim 8, wherein said cluster manager synchronizes creation of said second configuration file, verification of said modified configuration, and operation of said cluster utilizing said modified configuration between said plurity of computer systems.

14. The cluster data processing system of claim 8, wherein said cluster manager aborts said dynamic reconfiguration of said cluster in response to a failure of any of said plurity of computer systems to successfully complete creation of said second configuration file and verification of said modified configuration.

15. A program product for dynamically reconfiguring a cluster including a plurality of computer systems, said program product comprising:

a cluster manager executable by at least one of a plurality of computer systems within a cluster, each of said plurality of computer systems within said cluster having a first configuration file containing a current configuration of said cluster, wherein said cluster manager creates a second configuration file at each of said plurality of computer systems, said second configuration file specifying a modified configuration including a modified cluster topology, and wherein said cluster manager verifies said modified configuration of said cluster, and in response to said verification, operates said cluster utilizing said modified configuration; and an information bearing media bearing said cluster manager.

16. The program product of claim 15, wherein said cluster manager verifies said modified configuration by establishing communication with each computer system that is within said modified configuration and not within said current configuration.

17. The program product of claim 15, wherein said cluster manager synchronizes creation of said second configuration file, verification of said modified configuration, and operation of said cluster utilizing said modified configuration between said plurality of computer systems.

18. The program product of claim 15, wherein said cluster manager aborts dynamic reconfiguration of said cluster in response to a failure of any of said plurality of computer systems to successfully complete creation of said second configuration file and verification of said modified configuration.

19. A program product for dynamically reconfiguring a cluster including a plurality of computer systems, said program product comprising:

a cluster manager executable by at least one of a plurality of computer systems within a cluster, each of said plurality of computer systems within said cluster having a first configuration file containing a current configuration of said cluster, wherein said cluster manager creates a second configuration file at each of said plurality of computer systems, said second configuration file specifying a modified configuration including a diverse set of cluster resources than specified by said first configuration file, and wherein said cluster manager verifies said modified configuration of said cluster, and in response to said verification, operates said cluster utilizing said modified configuration; and an information bearing media bearing said cluster manager.

20. The program product of claim 19, wherein said cluster manager verifies said modified configuration by verifying ownership by said plurality of computer systems of selected resources accessible under said modified configuration.

21. The program product of claim 19, wherein said cluster manager synchronizes creation of said second configuration file, verification of said modified configuration, and operation of said cluster utilizing said modified configuration between said plurality of computer systems.

22. The program product of claim 19, wherein said cluster manager aborts dynamic reconfiguration of said cluster in response to a failure of any of said plurality of computer systems to successfully complete creation of said second configuration file and verification of said modified configuration.

* * * * *

UNITED STATES PATENT AND TRADEMARK OFFICE
CERTIFICATE OF CORRECTION

PATENT NO. : 5,822,531
DATED : October 13, 1998
INVENTOR(S) : *GORCZYCA ET AL.*

It is certified that error appears in the above-identified patent and that said Letters Patent is hereby corrected as shown below:

In col. 9, line 52, please delete "a" following "the cluster."

In col. 10, line 2, please delete "accessable" and insert --accessible--.

In col. 10, line 8, please delete "plurity" and insert --plurality--.

In col. 10, line 12, please delete "plurity" and insert --plurality--.

Signed and Sealed this

Eighteenth Day of May, 1999

*Attest:*

Q. TODD DICKINSON

*Attesting Officer*

*Acting Commissioner of Patents and Trademarks*